United States Patent
Hardy et al.

(10) Patent No.: US 10,719,133 B2
(45) Date of Patent: Jul. 21, 2020

(54) APPARATUS AND METHOD FOR DETERMINING AN INTENDED TARGET

(71) Applicant: Jaguar Land Rover Limited, Coventry (GB)

(72) Inventors: Robert Hardy, Coventry (GB); Lee Skrypchuk, Coventry (GB); Bashar Ahmad, Coventry (GB); Patrick Langdon, Coventry (GB); Simon Godsill, Coventry (GB)

(73) Assignee: JAGUAR LAND ROVER LIMITED, Coventry, Warwickshi (GB)

( * ) Notice: Subject to any disclaimer, the term of this patent is extended or adjusted under 35 U.S.C. 154(b) by 241 days.

(21) Appl. No.: 15/320,062

(22) PCT Filed: Jul. 6, 2015

(86) PCT No.: PCT/EP2015/065347
§ 371 (c)(1),
(2) Date: Dec. 19, 2016

(87) PCT Pub. No.: WO2016/001446
PCT Pub. Date: Jan. 7, 2016

(65) Prior Publication Data
US 2018/0173314 A1 Jun. 21, 2018

(30) Foreign Application Priority Data

Jul. 4, 2014 (GB) .................................. 1411997.8
Apr. 16, 2015 (GB) ..................................... 1506485

(51) Int. Cl.
*G06F 3/01* (2006.01)
*G06F 3/0346* (2013.01)
*G07C 5/08* (2006.01)

(52) U.S. Cl.
CPC .............. *G06F 3/017* (2013.01); *G06F 3/011* (2013.01); *G06F 3/014* (2013.01); *G06F 3/0346* (2013.01); *G07C 5/0808* (2013.01)

(58) Field of Classification Search
CPC .......... G06F 3/017; G06F 3/011; G06F 3/014; G06F 3/0346; G07C 5/0808
(Continued)

(56) References Cited

U.S. PATENT DOCUMENTS 8,649,999 B1  2/2014 Sheng et al.
2005/0243061 A1* 11/2005 Liberty ................ A61B 5/1171
345/158

(Continued)

OTHER PUBLICATIONS

Notice of Preliminary Rejection with English language translation, KR Application No. 10-2017-7000031, dated Jan. 3, 2018, 12 pp.
(Continued)

*Primary Examiner* — Amare Mengistu
*Assistant Examiner* — Gloryvid Figueroa-Gibson
(74) *Attorney, Agent, or Firm* — Miller Nash Graham & Dunn LLP (57) ABSTRACT

Embodiments of the present invention provide a human-machine interaction method of determining an intended target of an object in relation to a user interface, comprising determining a three-dimensional location of the object at a plurality of time intervals, determining a metric associated with each of a plurality of items of the user interface, the metric indicative of the respective item being the intended target of the object, wherein the metric is determined based upon a model and the location of the object in three dimensions at the plurality of time intervals, and determining, using a Bayesian reasoning process, the intended target from the plurality of items of the user interface based on the metric associated with each of the plurality of items.

19 Claims, 6 Drawing Sheets

(58) Field of Classification Search
USPC .......................................................... 345/156
See application file for complete search history.

(56) References Cited

U.S. PATENT DOCUMENTS

| | | | |
|---|---|---|---|
| 2011/0083089 A1 | 4/2011 | Pahud et al. | |
| 2011/0199298 A1* | 8/2011 | Bassompiere | G01C 21/16 345/157 |
| 2012/0005058 A1* | 1/2012 | Buck | G06Q 40/04 705/37 |
| 2013/0035890 A1* | 2/2013 | Wang | G06F 3/03 702/92 |
| 2013/0194193 A1* | 8/2013 | Kawalkar | G06F 3/041 345/173 |
| 2014/0078044 A1 | 3/2014 | Yamashita | |
| 2014/0125590 A1* | 5/2014 | Flagg | G06F 3/017 345/157 |
| 2014/0168378 A1* | 6/2014 | Hall | G06F 3/017 348/47 |

OTHER PUBLICATIONS

Communication pursuant to Article 94(3) EPC, EP Application No. 15733773.4, dated Sep. 20, 2018, 7 pp.

Ahmad et al, "Bayesian Target Prediction From Partial Finger Tracks: Aiding Interactive Displays in Vehicles," 2014 17th International Conference on Information Fusion, Jul. 7-10, 2014, 7 pages.

Ahmad et al, "Destination Inference Using Bridging Distributions," ICASSP 2015, pp. 5585-5589.

Ahmad et al, "Intent Inference for Hand Pointing Gesture-Based Interactions in Vehicles," IEEE Transactions on Cybernetics, vol. 46, No. 4, Apr. 2016, pp. 878-889.

Ahmad et al, "Interactive Displays in Vehicles: Improving Usability with a Pointing Gesture Tracker and Bayesian Intent Predictors," Proceedings of the 6th International Conference on Automotive User Interfaces and Interactive Vehicular Applications, Sep. 19, 2014, pp. 1-8.

Ahmad et al., "Probabilistic Intentionality Prediction for Target Selection Based on Partial Cursor Tracks," In: Universal Access in Human-Computer Interaction Aging and Assistive Environments. Proceedings of the 8th International Conference, Greece, Jun. 22-27, 2014, pp. 427-438.

Biswas et al., "Intent Recognition Using Neural Networks and Kalman Filters," HCI-KDD 2013, LNCS 7947, 2013, pp. 112-123.

Tamura et al, "Deskwork Support System Based on the Estimation of Human Intentions," Proceedings of the 2004 IEEE International Workshop on Robot and Human Interactive Communication, Japan, Sep. 20-22, 2004, pp. 413-418.

Combined Search and Examination Report, GB Application No. 1411997.8, dated Dec. 24, 2014, 6 pages.

Combined Search and Examination Report, GB Application No. 1506485.0, dated Oct. 1, 2015, 8 pages.

Combined Search and Examination Report, GB Application No. 1511789.8, dated Jan. 28, 2016, 9 pages.

International Search Report, PCT/EP2015/065347, dated Sep. 10, 2015, 5 pages.

* cited by examiner (a) Vehicle is stationary.

(b) Vehicle is moving at varying speeds and over uneven road.

APPARATUS AND METHOD FOR DETERMINING AN INTENDED TARGET

RELATED APPLICATIONS

This application is a 35 U.S.C. § 371 national stage application of PCT Application No. PCT/EP2015/065347, filed on Jul. 6, 2015, which claims priority from Great Britain Patent Application No. 1411997.8 filed on Jul. 4, 2014, and Great Britain Patent Application No. 1506485.0 filed on Apr. 16, 2015, the contents of which are incorporated herein by reference in their entireties. The above-referenced PCT International Application was published in the English language as International Publication No. WO 2016/001446 A1 on Jan. 7, 2016.

TECHNICAL FIELD

The present disclosure relates to an apparatus and a method for determining an intended target of an object.

BACKGROUND

It is common for a user to interact with a machine, so called human machine interaction (HMI), via a pointing selection action, hereinafter referred to as a pointing gesture. For example the user may point to a button or other control or an interactive display such as graphical user interface (GUI) which may be displayed on a touch-sensitive display device. However, especially when such gestures are used in moving vehicles which can lead to erratic and unpredictable perturbations in the user input resulting in erroneous selection(s), this may compromise system usability and tie up an undesirable amount of the user's attention, particularly if the user is the driver of the vehicle.

It is an object of embodiments of the invention to at least mitigate one or more of the problems of the prior art. It is an object of embodiments of the invention to reduce a duration of a pointing gesture. It is an object of embodiments of the invention to improve an accuracy of a pointing gesture.

SUMMARY OF THE INVENTION

According to an aspect of the present invention there is provided a method and apparatus as set forth in the appended claims.

According to an aspect of the present invention there is provided a human-machine interaction method of determining an intended target of an object in relation to a user interface, comprising: determining a three-dimensional location of the object at a plurality of time intervals; determining a metric associated with each of a plurality of items of the user interface, the metric indicative of the respective item being the intended target of the object, wherein the metric is determined based upon a model and the location of the object in three dimensions at the plurality of time intervals; and determining, using a Bayesian reasoning process, the intended target from the plurality of items of the user interface based on the metric associated with each of the plurality of items.

A human-machine interface (HMI) system for determining an intended target of an object in relation to a user interface, comprising location determining means for determining a three-dimensional location of the object, a memory means for storing data indicative of the location of the object in three dimensions at a plurality of instants in time, a processing means arranged to determine a metric associated with each of a plurality of items of a user interface of the respective item being the intended target of the object, wherein the metric is determined based upon a model and the location of the object at the plurality of time intervals, and determine, using a Bayesian reasoning process, the intended target from the plurality of items of the user interface based on the metric associated with each of the plurality of items.

According to an aspect of the present invention there is provided a method of determining an intended target of an object, comprising determining a location of the object at a plurality of time intervals; determining a metric associated with each of a plurality of targets, the metric indicative of the respective target being the intended target of the object, wherein the metric is determined based upon a model and the location of the object at the plurality of time intervals; determining, using a Bayesian reasoning process, the intended target from the plurality of targets based on the metric associated with each of the plurality of targets.

Optionally, the intended target is determined based on the location of the object. The intended target may be determined before the object reaches the target.

The method may comprise determining a trajectory of the object. The trajectory of the object may comprise data indicative of the location of the object at a plurality of time intervals. Using the trajectory of the object may improve determination of the intended target.

The method may comprise filtering the trajectory of the object. The filtering may smooth the trajectory of the object and/or the filtering may reduce unintended movements of the object and/or noise from the trajectory. Advantageously filtering the trajectory may reduce an influence of unintended movements such as jumps or jolts.

The model may be a Bayesian intentionality prediction model. The model may be a linear model. The model may be based on one or more filters; optionally the one or more filters are Kalman filters.

The model may be a non-linear model. The model may incorporate irregular movements of the object. The non-linear model may be based on one or more statistical filters; optionally particle filters.

The model may be a model based on a learnt distribution based upon historical data, which may be Gaussian or otherwise. The model may be a nearest neighbour (NN) model. The NN model may determine the metric based upon a distance between the location of the object and each of the targets. The metric may be indicative of a distance between the object and each of the targets.

The model may be a bearing angle (BA) model. The metric may be indicative of an angle between the trajectory of the object and each of the targets.

The model may be a heading solid angle (HSA) model. The metric may be indicative of a solid angle between the object and each of the targets.

The model may be a Linear Destination Reversion (LDR) or a Nonlinear Destination Reversion (NLDR) model. The method may comprise determining a model for each of the targets. The metric may be indicative of the model best matching the trajectory of the object. The NLDR model may comprise non-linear perturbations of the trajectory.

The model may be a Mean Reverting Diffusion (MRD) model. The MRD may model a location of the object as a process reverting to the intended target.

The model may be an Equilibrium Reverting Velocity (ERV) model. The metric may be based upon a speed of travel of the object to the target.

The model may be a bridging model. The bridging model may be based on one or more bridges. For example the bridging model may be based on a bank of Markov bridges. Each bridge may be determined to terminate at a nominal intended destination of the tracked object and may be based upon the spatial area of a plurality of targets and/or a duration of the plurality of time intervals.

The method may comprise determining a state of the object.

The method may comprise receiving one or more items of environmental information. The environmental information may comprise one or more of information indicative of acceleration, information indicative of a state of the vehicle and/or image data indicative of vehicle surroundings. The determination of the metric may be based, at least in part, on the one or more items of environmental information. The model may be selected based, at least in part, on the one or more items of environmental information.

The determining the intended target may be based on a cost function. The cost function may impose a cost for incorrectly determining the intended target. The intended target may be determined so as to reduce the cost function.

The determining the intended target may be based on one or more items of prior information. The prior information may be associated with at least some of the targets. The prior information may be indicative of previously selected targets. Advantageously the prior information may improve determination of the intended target.

The method may comprise selecting a plurality of most recent time intervals, wherein the determining the metric associated with each of the plurality of targets may be based upon the location of the object at the plurality of most recent time intervals.

The object may be a pointing object. The location of the object may be determined in three dimensions. Determining the location of the object may comprise tracking the location of the object. Determining the location of the object may comprise receiving radiation from the object.

The method may comprise outputting an indication of the intended target. The indication of the intended target may comprise identifying the intended target; optionally the intended target may be visually identified. Advantageously the user may become aware of the determined intended target. The user may then cause selection of the intended target.

The method may comprise outputting the indication of the intended target and one or more possible targets. The method may comprise activating the intended target.

The plurality of targets may comprise one or more of graphically displayed items or physical controls. The location of the object may be determined in three-dimensions.

According to an aspect of the present invention there is provided a system for determining an intended target of an object, comprising location determining means for determining a location of the object; a memory means for storing data indicative of the location of the object at one or more instants in time; a processing means arranged to determine a metric associated with each of a plurality of targets of the respective target being the intended target of the object, wherein the metric is determined based upon a model and the location of the object at the plurality of time intervals; determine, using a Bayesian reasoning process, the intended target from the plurality of targets based on the metric associated with each of the plurality of targets.

The processing means may be arranged to perform a method according to the first aspect of the invention.

The location determining means may comprise means for receiving radiation from the object. The location determining means may comprise one or more imaging devices.

Location data indicative of the location of the object at each instant in time may be stored in the memory means.

The system may comprise one or more accelerometers for outputting acceleration data. Advantageously the acceleration data may be used in the determination process, for example to improve the determination e.g. by selecting a model.

The system may comprise a display means for displaying a graphical user interface (GUI) thereon, wherein the plurality of targets are GUI items.

The model of the system may be a bridging model. The bridging model may be based on one or more bridges. For example the bridging model may be based on a bank of Markov bridges. Each bridge may be determined to terminate at a nominal intended destination of the tracked object and may be based upon the spatial area of a plurality of targets and/or a duration of the plurality of time intervals.

The processing means may be arranged to receive environmental data from one or more sensing means; optionally the sensing means may comprise means for determining a state of the vehicle and/or imaging devices.

According to an aspect of the invention there is provided a vehicle comprising a processing device arranged, in use, to perform a method according to a first aspect of the invention or comprising a system according to the second aspect of the invention.

According to an aspect of the present invention there is provided a method of determining an intended target of an object, comprising determining a location of the object at a plurality of time intervals; determining a probability associated with a target of said target being an intended target.

The probability may be determined based upon a model and the location of the object at the plurality of time intervals.

According to an aspect of the present invention there is provided an apparatus comprising a processing device arranged, in use, to determine an intended target of an object, wherein the processing device is arranged to determine a location of the object at a plurality of time intervals; and to determine a probability associated with a target of said target being an intended target.

As used herein, the term "processing means" will be understood to include both a single processor, control unit or controller and a plurality of processors, control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions. It will also be understood that the term "location determining means" may be understood to mean one or more location determining devices for determining a location of the object and that the term "memory means" may be understood to means one or more memory devices for storing data indicative of the location of the object at one or more instants in time.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only, with reference to the accompanying figures, in which.

DETAILED DESCRIPTION

Embodiments of the present invention relate to methods and apparatus for determining an intended target of an object. The object may be a pointing object, such as a stylus or finger, although it will be realised that this is not limiting. Embodiments of the invention will be explained, by way of example, with reference to fingertip pointing gestures which are performed in vehicles. It will be realised, however, that the pointing object may be an object other than a finger, such an elongate object e.g. a stylus. Furthermore embodiments of the invention are not limited to use within a vehicle and may be used, for example, to determine the intended destination of a pointing object upon a computing device such as a tablet computer or smartphone, for example. Furthermore, embodiments of the invention will be explained with reference to determining the intended destination of the pointing object upon a display device. In particular determining one or a plurality of graphical objects displayed on the display device which is the intended target, or which have a likelihood of being the intended target. It will be realised that embodiments of the invention are not limited the intended target being displayed on a surface of the display device. The display device may be a device for projecting an image onto a surface, such as an interior surface of a vehicle, and detecting the intended target, which may be a graphical object displayed on the surface. For example the surface may be a dashboard or interior portion of the vehicle, although it will be realised that other surfaces may be envisaged. The intended target may also be one of a plurality of physical buttons or other controls, for example. The image may comprise a 3D heliograph and/or a stereoscopic image in some embodiments.

Figure 1:
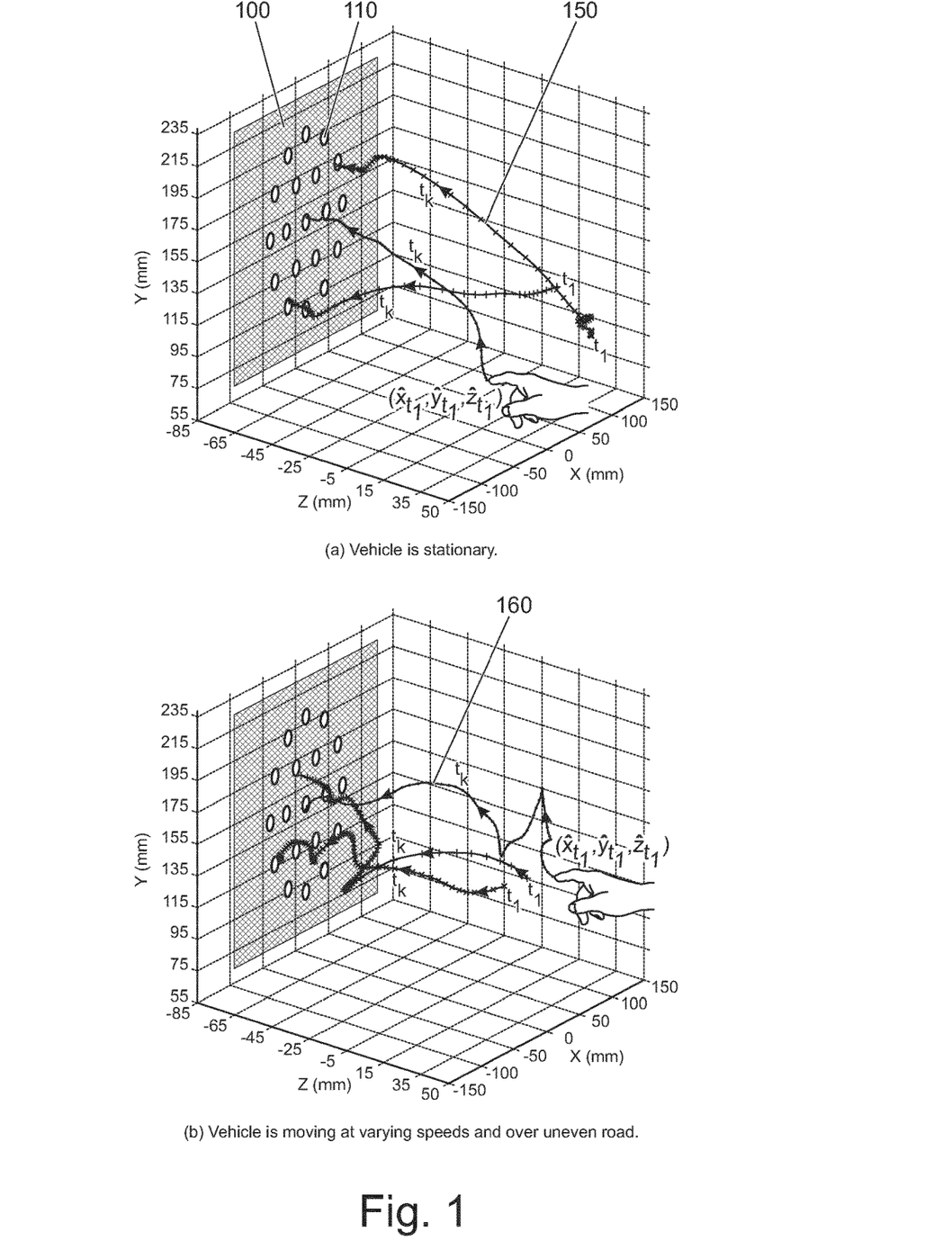
FIG. 1 shows an illustration of fingertip trajectories during pointing gestures.

Referring to FIG. 1 there is illustrated a fingertip trajectory in three-dimensions (3D) for three separate pointing tasks to select one of a plurality of graphical items displayed on a display device within a vehicle. A location of the fingertip is determined at each of a plurality of time intervals $t_n$ from $t_1$ to $t_k$. At each time interval a location of the fingertip is determined in 3D as a location vector $m_n = [\hat{x}_{t_n}, \hat{y}_{t_n}, \hat{z}_{t_n}]^T$. The vector $m_n$ is used to represent a recorded pointing object location, e.g. of the finger, which may include noise and/or perturbations.

In some embodiments $m_n$ may be determined with reference to an origin of a sensor arranged to detect the fingertip location, although in other embodiments $m_n$ may be determined with reference to another location, such as a location within the vehicle, for example a location about the display device. Furthermore, in some embodiments, the vector $m_n$ may comprise other sensor data such as that output by one or more accelerometers, gyroscopes etc. In other words, the vector $m_n$ may represent information additional to the position of the object.

FIG. 1(a) illustrates the fingertip trajectory 150 (only one of which is numbered for clarity) for three separate pointing tasks to select different graphical items or buttons which are represented as circles 110 (only one of which is numbered for clarity) displayed on a display device 100 in a stationary vehicle. As can be appreciated, even within a stationary vehicle, the trajectories are irregular. FIG. 1(b) illustrates trajectories 160 (again only one of which is numbered) for three separate pointing tasks to select different displayed graphical items whilst the vehicle is moving at varying speeds over an uneven road. As can be appreciated the trajectories experience significant perturbations. Other perturbations may arise from, for example, a user walking whilst holding a computing device and attempting a pointing gesture.

Figure 2:
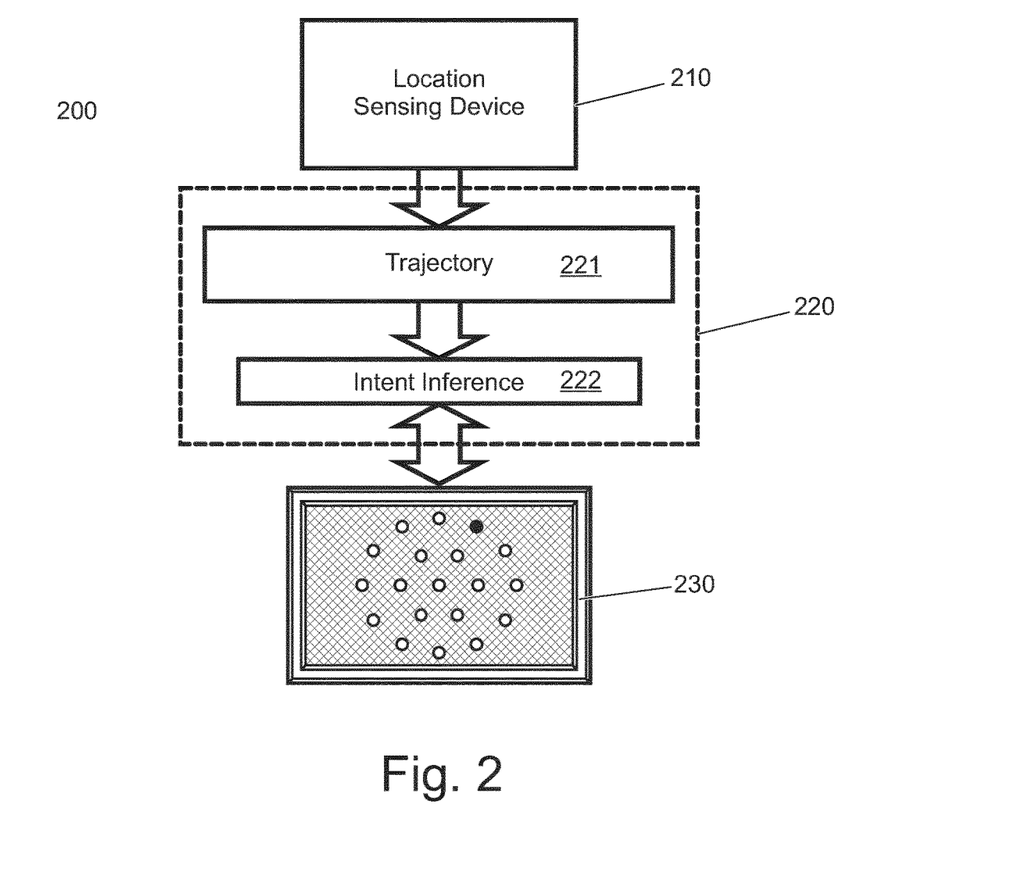
FIG. 2 shows an illustration of a system according to an embodiment of the invention.

FIG. 2 illustrates a system 200 according to an embodiment of the present invention. The system 200 is a system for determining an intended target of a pointing object. The system 200 comprises a means 210 for determining a location of the pointing object, a processing means 220 for determining the intended target of the pointing object and a display means 230 for displaying at least one possible target of the pointing object although, as noted above, in other embodiments the possible targets of the pointing object may be a physical object such as a button or other control and thus the display is optional. The processing means 220 may determine whether a target of the pointing object is intended, or has been accidentally targeted. For example whether a graphical item or button was intended to be touched by the user or is touched accidentally such as due to movement of the vehicle. Accordingly the input may be discarded if the processing means 220 determines the target to be unintended. Responsive to the processing means determining the intended target, in some embodiments the display means 230 may be caused to act responsive to the determination to aid a selection process, such as by highlighting the intended target, or one or more possible targets, or to enlarge a portion of information displayed on the display means 230.

In some embodiments the system 200 may include or receive data from one or more additional sensors, such as one or more accelerometers, sensors monitoring a suspension of the vehicle, one or more cameras, such as forward facing to face the road to enable road condition classification, etc. The one or more sensors may help establish an operating environment of the system 200. For example, an accelerometer/camera may be used establish that a lot of vibrations are being or are about-to-be experienced. The one or more accelerometers may enable the system to adapt to prevailing conditions, such as by selecting an appropriate model, as will be explained.

The means 210 for determining the location of the object is a location sensing device 210. The location sensing device may determine the location of the object based on data from one or more devices responsive to received radiation. The radiation may be emitted from one or more devices forming part of the system 200, such as sound waves or electromagnetic radiation. The location sensing device may, in one embodiment, be an accelerometer associated with the object being tracked. The location sensing device may comprise one or more imaging devices for outputting image data relating to the object. The one or more imaging devices may be one or more cameras arranged to output image data including image data corresponding to the object such that the location of the object may be determined therefrom. The location sensing device may be a commercially available device such as a Microsoft Kinect® or a Leap Motion® Controller available from Leap Motion, Inc. It will be realised that other devices may be used.

The location sensing device 210 may be arranged to output data from which the location of the object may be determined by the processing means 220 or the location sensing device 210 may output location data indicative of the location of the object. In one embodiment the location sensing device 210 is arranged to output location data at a time instant $t_k$ of the form $m_k \triangleq [\hat{x}_{t_k}, \hat{y}_{t_k}, \hat{z}_{t_k}]^T$ indicative of the location of the object. A value of $m_k$, which may be in mm, may specify the location of the object with reference to a predetermined datum. The datum may be relative to the location sensing device 210 or may be relative to another datum such as a point about the display device 230.

The location sensing device or the processing means 220 may be arranged to extract or identify the object by performing data association, such as when the location sensing device 210 temporarily loses track of the object. For example, several objects may be detected within a field of vision of the location sensing device 210, such as a pointing hand with several possible fingers, steering wheel, rear viewing mirror, etc. Extracting and/or identifying the desired object such as a pointing finger or other object may be performed as a preliminary step.

The display means 230 is a display device for displaying one or more selectable items which may form part of a graphical user interface (GUI). The display device may be a touch-sensitive screen for outputting visual images comprising the one or more selectable items which may form part of the GUI. The display device 230, in response to a user touching a surface of the screen, may output data indicative of a touched location or may output data indicative of the selected item. In another embodiment the display device 230 may comprise a projection device arranged to project an image onto a surface, such as an interior surface of the vehicle, where the image comprises a selectable object displayed on the surface. For example the surface may be a dashboard or interior portion of the vehicle, although it will be realised that other surfaces may be envisaged.

The processing means 220 may be a processing device comprising one or more processors and memory accessible to the processing device. The memory may store computer software arranged, when executed by the processing device, to perform a method according to an embodiment of the invention. The memory may also, in use, store data indicative of the location of the object at one or more instants in time.

The processing means 220 may comprise a trajectory module 221 for determining the trajectory of the object. It will be realised that the term trajectory may be understood to mean the location of the object at a plurality of instants in time. The trajectory module 221 is arranged to determine a likelihood of one or more possible targets being the intended target of the object.

In particular, the trajectory module 221 may determine, at an instant in time $t_k$, the probability of a selectable item $B_i$ being the intended target as $P(B_i|m_{1:k})$ where $b_i=[b_{x,i}, b_{y,i}, b_{z,i}]^T$ denotes coordinates of a centre of an $i^{th}$ selectable icon $B_i$ and $m_{1:k} \triangleq \{m_1, m_2, \ldots, m_k\}$ comprises all available coordinates of the object at consecutive discrete times $\{t_1, t_2, \ldots, t_k\}$. The trajectory module 221 may determine, in some embodiments, $c_{1:k} \triangleq \{c_1, c_2, \ldots, c_k\}$ as a processed location of the object such as after a pre-processing operation has been performed to, for example, smooth the trajectory of the object. The pre-processing may remove one or more of noise, unintentional movements, vibrations, jumps etc. from the location data $m_{1:k}$ to produce $c_{1:k}$. Unintentional movements are, for example, those illustrated in FIG. 1(b). It will be appreciated that in the following $m_{1:k}$ may be replaced with $c_{1:k}$.

In some embodiments the trajectory module 221 may determine a probability for each of a plurality N of items $\mathcal{B} = \{B_i: i=1, 2, \ldots N\}$ where $\mathcal{B}$ is a set of items such as selectable GUI items as $P(B_i|m_{1:k})$.

A filtering operation may be performed to reduce erratic or unintentional movements of the object. Such movements may be due to road or driving conditions e.g. the road being uneven or the vehicle being driven enthusiastically, such as in a sporting manner. Such movements may also be due to a user walking or moving.

The filtering operation may be a Monte Carlo filtering operation such as Sequential Monte Carlo (SMC). The filtering is performed before an intent inference process, as will be described. The output of the filtering operation at the time instant $t_n$ is indicative of a true location of the pointing object denoted by $c_n = [x_{t_n}, y_{t_n}, z_{t_n}]^T$, thus after removing unintentional movements or undesired noise.

For mild perturbations, the filtering operation may be based on linear state space model of the object's movements. The model may lead to a linear statistical filtering operation, e.g. Linear Kalman filter. More erratic unintentional pointing object movements, e.g. significant jumps or jolts, may be modelled as jumps that may lead to non-linear implementations, e.g. Monte Carlo filtering such as Sequential Monte Carlo (SMC) or Markov Chain Monte Carlo (MCMC) or any other numerical approach.

The probability $P(B_i|m_{1:k})$ or $P(B_i|c_{1:k})$ of an item being the intended target is determined according to a model and the trajectory of the object. The model may be a linear or a non-linear model. The model may, in some embodiments, model unintended movements such as jumps or jolts due to perturbations i.e. movement such as arising from vehicle movement.

The model may be one of a Nearest Neighbour (NN), Bearing Angle (BA), Heading and Solid Angle (HSA), Linear Destination Reversion (LDR) such as the Mean Reverting Diffusion (MRD) as well as Equilibrium Reverting Velocity (ERV), Nonlinear Destination Reversion (NLDR) and a Bridging Distribution (BD). In addition to the information below, further information associated with these models according to embodiments of the invention is provided in the accompanying draft papers.

The intent inference module 222 is arranged to determine an intended target of the object. The intended target is determined using a Bayesian approach. The intent inference module 222 may be arranged to determine the intended target from the plurality N of targets based on the likelihood associated with each of the plurality of targets $P(B_i|m_{1:k})$. This may be equivalent to calculating the Maximum a Posteriori (MAP) via:

$$\hat{B}(t_k) = \arg \mathcal{B} P(B_i|m_{1:k})$$

for the set of N nominal targets where $\hat{B}(t_k)$ is the predicted destination and $P(B_i|m_1:k) \propto P(m_1:k|B_i) P(B_i)$ according to Bayes' rule $P(B_i|m_{1:k}) \propto P(m_{1:k}|B_i) P(B_i)$.

The following sections provide a discussion of a plurality of models which may be used by the trajectory module 221.

Nearest Neighbour (NN) Model

In the NN model the likelihood P is assigned to each item based on a distance to the current position of the object at an instant in time $t_k$. Unlike traditional approaches to NN, here a probabilistic interpretation of the nearest neighbour model is formulated such that the probability of each nominal destination is calculated.

This approach chooses the item such as the interface selectable icon that is closest to the current position of the object such as the pointing finger, i.e. $B_i \in B$ with the smallest Euclidean distance $d_{k,i} = \|c_k - b_i\|_2$, i=1, 2, ..., N. In a probabilistic framework, this can be expressed as $$P(c_k|B_i) = p(c_k|f(b_i), \sigma_{NN}^2) \tag{5}$$

where p(.) is either a known distribution, for example Gaussian, or a distribution learnt from previously recorded data. Whereas, the distribution mean $f(b_i)$ is a function of the location of the $i^{th}$ destination, for example $f(b_i)=b_i$. The most simple NN model is given by $P(c_k|B_i) = \mathcal{N}(c_k|b_i, \sigma_{NN}^2)$ where the object location $c_k$ has a multivariate normal distribution with a mean equal to that of the possible destination and a fixed covariance $\sigma_{NN}^2$. The latter is a design parameter. Assuming that the logged finger positions at various time instants are independent, the sought $P(c_{1:k}|B_i)$ reduces to $P(c_{1:k}|B_i) = \Pi_{n=1}^{k} P(c_n|B_i)$. Otherwise, the correlation between successive measurements will dictate combining the destination probabilities obtained from each measurement.

Bearing Angle (BA) Model

The BA model is based on an assumption that the object moves directly toward the intended destination. The BA model may use the current position of the object at an instant in time $t_k$ and a previous position of the object, which may be $t_{k-1}$. The bearing angle between the positions of the object and the item may be used to calculate the probability.

This model is based on the premise that the pointing finger is heading directly towards the intended destination, i.e. the cumulative angle between the finger positions and the target is minimal. For every two consecutive measurements, the bearing angle with respect to the destination can be assumed to be a random variable with zero mean and fixed variance as per $$P(c_k|c_{k-1}, B_i) = p(\theta_{i,k}|0, \sigma_{BA}^2) \tag{6}$$

where p(.) is either a known distribution, for example Gaussian, or a distribution learnt from previously recorded data. Whereas, $\theta_{i,k} = \angle(v_k, b_i)$ for $B_i, v_k = c_k - c_{k-1}$ and $\sigma_{BA}^2$ is a design parameter. We can write $$P(c_{1:k}|B_i) = P(c_1|B_i) \Pi_{n=2}^{k} P(c_n|c_{n-1}, B_i) \tag{7}$$

This algorithm can be considered to represent the best outcome of the linear-regression-extrapolation techniques; e.g. assuming that the distance to the intended destination $d_M$ is accurately estimated. According to (6) and (7), BA forms a wedge-shaped confidence interval whose width is set by $\sigma_{BA}^2$. Any selectable icon that falls within this region is assigned a high probability.

Heading and Solid Angle (HSA) Model

The HSA model is based upon a distance of the object from the item at an instant in time $t_k$ and a solid angle of the item. The HSA model may use the current position of the object at an instant in time $t_k$ and a previous position of the object, which may be $t_{k-1}$.

Figure 3:
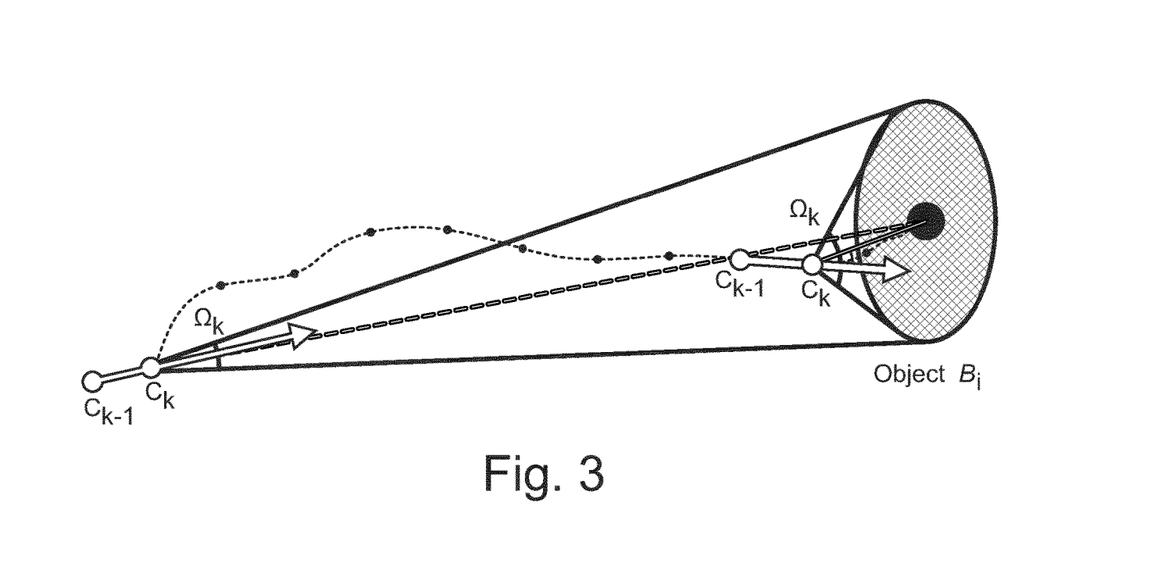
FIG. 3 illustrates a solid angle for a target.

In the HSA model an object $B_i$ has a smaller solid angle if the observer is far from its location compared with that if the observer is nearby as demonstrated in FIG. 3. Solid angle (in steradians) of a sphere located at distance $d_{i,k}$ is approximated by $$\Omega_{i,k} = \frac{A \cos(\alpha_k)}{\pi d_{i,k}^2 + A} \tag{8}$$

where A is the area of the target object. Targets of the arbitrary shapes can be closely approximated by a number of spheres. Parameter $\alpha_k$, which is the exposure angle, is irrelevant to the prediction problem and $\alpha_k = 0$ is assumed. The direction of travel is specified by the measured velocity vector $v_k$ at $t_k$ and the HSA likelihood probability for two consecutive pointing positions can be obtained via $$P(c_k|c_{k-1}, B_i) = \mathcal{N}(\theta_{i,k}|0, \kappa \Omega_{i,k}). \tag{9}$$

Similar to the BA model, the divergence of the bearing from the location of $B_i$ is defined by $\theta_{i,k} = \angle(v_k, b_i)$, $\kappa$ which is a design parameter. If the pointing finger is in close proximity to a possible target bigger $\theta_{i,k}$ values are tolerated due to the resultant $\Omega_{i,k}$. The HSA model can be viewed as a combined BA and NN model. The probability $P(c_{1:k}|B_i)$ can be calculated similar to (7).

It is noted that a distribution other than Gaussian with the relative moments, for example learnt from the collected pointing trajectories, can be applied in the NN, BA and HSA prediction models.

Linear Destination Reverting (LDR) Model

In this approach, the movement of a pointing object is modelled as a function of the intended destination. The characteristics of the pointing movements captured by the adopted model are denoted by a state $s_t$ at time t. They can include the pointing object location, multidimensional velocity, multidimensional acceleration, etc. An underlying premise is that the pointing object reverts to the intended destination at a rate that can be specified in the model. A Markov process is then defined where the current pointing movement characteristics is a linear function of the one or more previous moves and the destination. Thus, each of the N possible destinations in a set $\mathcal{B}=\{B_i: i=1, 2, \ldots N\}$ is associated with a model. The model that matches the characteristics of the pointing object pointing trajectory in the current pointing task is assigned high probability and vice versa. Below we describe two possible LDR models.

Mean Reverting Diffusion (MRD)

The MRD models the object movements as a process that reverts to a particular average value, for example a possible destination. It may only considers the location characteristic of the pointing movement and therefore $s_k=c_k$. It assumes that the current pointing object location should be at the destination that exerts an attraction force to bring the pointing object to its location. In a continuous-time, the pointing object movement is modelled as a multivariate Ornstein-Uhlenbeck process with a mean-reverting term. For the N possible destination, it is described by $$ds_{i,t} = \Lambda(b_i - s_t)dt + \sigma dw_t, \quad i=1, 2, \ldots, N. \quad (10)$$

The square matrix $\Lambda$ sets the mean reversion rate that steers the evolution of the process, $b_i$ is location of the $i^{th}$ possible destination, $\sigma$ is a square matrix that drives the process dispersion and $w_t$ is a Wiener process. Upon integration of (10) and discretising the outcome, we have:

$$s_{i,k} = e^{-\Lambda \tau_k} s_{i,k-1} + [I_3 - e^{-\Lambda \tau_k}]b_i + v_k, \quad i=1, 2, \ldots, N \quad (11)$$

where $s_{i,k}$ and $s_{i,k-1}$ are the state vectors with respect to $B_i$ at the time instants $t_k$ and $t_{k-1}$ respectively. The time step is denoted by $\tau_k = t_k - t_{k-1}$ and $v_k \sim \mathcal{N}(0, \sigma^2)$ is an additive Gaussian noise.

Equilibrium Reverting Velocity (ERV)

Each of the nominal destinations is assumed to have a gravitational field with strength inversely proportional to distance away from its centre $b_i$. The speed of travel of the object towards the destination location $b_i$ is expected to be highest when the object is far from $b_i$ and vice versa. The movements of the object are modelled with respect to the $i^{th}$ destination as $$ds_{i,t} = A(\breve{\mu}_i - s_t)dt + \breve{\sigma} d\breve{w}_t \quad (12)$$

where $s_t = [x_t, \dot{x}_t, y_t, \dot{y}_t, z_t, \dot{z}_t]^T$ such that $\dot{x}_t, \dot{y}_t$ and $\dot{z}_t$ are the velocities along the x, y and z axes, respectively. Whereas, $A = \text{diag}\{A_x, A_y, A_z\}$, $$A_x = \begin{bmatrix} 0 & -1 \\ \eta_x & \rho_x \end{bmatrix}, A_y = \begin{bmatrix} 0 & -1 \\ \eta_y & \rho_y \end{bmatrix}, A_z = \begin{bmatrix} 0 & -1 \\ \eta_z & \rho_z \end{bmatrix},$$

$\breve{\mu} = [b_{x,i}, 0, b_{y,i}, 0, b_{z,i}, 0]^T$ encompassing the coordinates of $B_i$ and $\breve{w}_t$ is a Wiener process. Each of $\eta_x, \eta_y$ and $\eta_z$ dictates the restoration force along their corresponding axis; $\rho_x, \rho_y$ and $\rho_z$ represents a damping factor to smooth the velocity transitions. After integrating (12), we can represent the discretised resultant by $$s_{i,k} = \breve{F}_k s_{i,k-1} + \breve{\kappa}_{i,k} + \breve{w}_k \quad (13)$$

$$\breve{F}_k = \text{diag}\{e^{-A_x \tau_k}, e^{-A_y \tau_k}, e^{-A_z \tau_k}\}$$

$$\breve{\kappa} = \begin{bmatrix} (I_2 - e^{-A_x \tau_x})\breve{\mu}_{x,i} \\ (I_2 - e^{-A_y \tau_y})\breve{\mu}_{y,i} \\ (I_2 - e^{-A_z \tau_z})\breve{\mu}_{z,i} \end{bmatrix}$$

Given the Gaussian and linear nature of the LDR models, for example (11) and (13), a linear optimal recursive filter can be used to determine the sought $\{P(m_{1:k}|B_i): i=1, 2, \ldots, N\}$ assuming linearly collected measurements $m_k = H_k s_k + n_k$ such that $n_k$ is multivariate Additive White Gaussian Noise. For a destination $B_i$, probability $P(m_{1:k}|B_i)$ can be sequentially calculated since according to the chain rule the following applies $P(m_{1:k}|B_i) = P(m_k|m_{1:k-1}, B_i), \ldots, P(m_2|m_1, B_i) \times P(m_1|B_i)$. This implies that at time $t_k$, only the predictive probability $P(m_k|m_{1:k-1}, B_i)$ is required to determine $P(m_{1:k}|B_i)$ for the $i^{th}$ nominal destination. The pursued $P(m_k|m_{1:k-1}, B_i)$ can be obtained from a Linear Kalman Filter (LKF) whose purpose here is not to track the object, but to produce the predictive probability. As a result, the predictor compromises N Kalman filters each dedicated to a particular nominal suspected destination.

Linear destination reverting models, other than the MRD and ERV, that include more movement characteristics such as acceleration or jerks can be applied. Their implementation is similar to the MRD and ERV models via a bank of statistical filters.

Nonlinear Destination Reverting (NLDR) Model

In this approach, the movements of an object is assumed to include the destination, the characteristics of the pointing movements and nonlinear phenomena such as jumps or jolts representing perturbations in the pointing trajectory due to external factors. An example is carrying out a pointing task in a vehicle moving over harsh terrain as in FIG. 1b. An example of a perturbations process is the jump process $p_t$ which represent factors that knocks the pointing object off its planned trajectory. For example, $dp_t = \sigma_p dW_{2,t} + \sigma_J dJ_t$ where the jump process is $J_t = \Sigma_i^{l} P_i, P_i \sim \mathcal{N}(0,1)$ and l is the number of jumps/jolts. The jumps effect allows occasional large impulsive shocks to the pointing object location, velocity, acceleration, permitting the modelling of sharp jolts or sudden movements. Other nonlinear models that capture the characteristics of the present perturbations characteristics may be considered. The model state for each nominal destination $s_{i,t}$ in the NLDR incorporates the pointing object position $c_t = [x_t, y_t, z_t]^T$, other characteristics of $c_t$ (for example velocity $\dot{c}_t$ or acceleration $\ddot{c}_t$, etc.), perturbations $p_t$, other characteristics of $p_t$ and the destination $B_i$.

Similar to the LDR model the underlying premise is that the pointing object reverts to the intended destination at a rate that can be specified in the model. A Markov process is then defined where the current pointing movement characteristics is a linear function of the one or more previous moves, the present nonlinear perturbations and the destination. Thus, each of the N possible destinations in the set $\mathcal{B} = i = \{B_i: i=1, 2, \ldots N\}$ is associated with a model. The model that matches the characteristics of the pointing object pointing trajectory in the current pointing task is assigned high probability and vice versa. Accordingly, a bank of N statistical filters are applied to sequentially obtain the sought $\{P(m_{1:k}|B_i), i=1, 2, \ldots, N\}$. Approaches such as sequential Monte Carlo methods or other numerical techniques can be utilised to attain the pursued $P(m_{1:k}|B_i)$ given the nonlinear nature of the state evolution equation once the nonlinear perturbations are included. Minimising the computational complexity of the nonlinear filtering approaches can be achieve by assuming that the perturbations such as jumps or jolts are identical in the bank of N statistical filters. Hence, they need to be tracked or identified only once.

Bridging Distributions (BD) Model

In this approach, the movement of an object is modelled as a bridge distribution, such as a Markov bridge. In some embodiments the movement of the object is modelled as one of several Markov bridges, each incorporating one of a plurality of possible destinations, e.g. selectable icons on a GUI displayed on a touchscreen. The path of the object, albeit random, must end at the intended destination, i.e. it follows a bridge distribution from its start point to the destination. By determining a likelihood of the observed partial object trajectory being drawn from a particular bridge, the probability of each possible destination is evaluated. The bridging model may be based upon a Linear Destination Reversion (LDR) or a Nonlinear Destination Reversion (NLDR) model.

Where $\{B_i: i=1, 2, \ldots N\}$ is a set of N nominal destinations, e.g. GUI icons such as on an in-vehicle touchscreen although it will be realised that other GUIs may be envisaged. The objective is to determine the probability of each of these endpoints being the intended destination $B_1$ of the tracked object given a series of k measurements, $m_{1:k} \triangleq \{m_1, m_2, \ldots, m_k\}$, i.e. to calculate $P(B_i|m_{1:k})$ for all nominal destination, where $i=1, 2, \ldots, N$. The $k^{th}$ observation $m_k = [\hat{x}_{t_k}, \hat{y}_{t_k}, \hat{z}_{t_k}]'$ at time $t_k$ can be the object or pointing finger 3D coordinates. It is derived from a true, but unknown, underlying object position $c_k$; its velocity at the time $t_k$ is notated as $\dot{c}_k$.

The location of the tracked object, i.e. the pointing fingertip, at the end of the pointing task is that of the intended destination $B_I$. Let T be the total duration of the overseen task, i.e. the duration needed by the tracked object to reach its destination. The hidden state of the tracked object at time T is given by $s_T = [c_T' \, \dot{c}_T']' = \hat{b}_1$ where $c_T$ and $\dot{c}_T$ are the true finger position and velocity at T respectively; $\hat{b}_i = [b_i' \, v_i']'$ such that $b_i$ denotes the known location of the $i^{th}$ destination, e.g. GUI icon in 3D, and $v_i$ is the tracked object velocity upon reaching the destination. Thus, the probability of $B_i$ being the intended destination is:

$$p(B_i|m_{1:k}) \propto p(m_{1:k}|B_i)p(B_i) = p(B_i)\int p(m_{1:k}|s_T = \hat{b}_i)p(T|B_i) \, dT, \quad \text{(BD 1)}$$

since $p(m_{1:k}|s_T=\hat{b}_i)=p(m_{1:k}|B_i, T)$; T is unknown. The priors $p(B_i)$ summarise existing knowledge about the probability of various endpoints in $B_i$ being the intended one, before any pointing data is observed; they are independent of the current trajectory $m_{1:k}$. Uninformative priors can be constructed by assuming that all possible destinations are equally probable, i.e. $p(B_i)=1/N$, $i=1, 2, \ldots, N$. However, if priors are available based on relevant contextual information, such as tracked object travel history, GUI interface design or user profile, they can easily be incorporated as per (BD 1). The objective, then, is to estimate the integral $\mathcal{A}_i = \int p(m_{1:k}|s_T=\hat{b}_i)p(T|B_i)dT$ for each of the N possible destinations. A simple quadrature approximation of $\mathcal{A}_i$ is given by:

$$\mathcal{A}_i \approx \Sigma_n p(m_{1:k}|s_{T_n}=\hat{b}_i)p(T_n|B_i)\Delta_{T_n} \quad \text{(BD 2)}$$

where $\Delta_{T_n} = T_n - T_{n-1}$ and the $T_n$ are quadrature points, ideally chosen to cover the majority of the probability mass in $p(T|B_i)$. More sophisticated quadrature or Monte-Carlo estimates could also be employed. Uniformly arrival times priors can be assumed, i.e. $p(T|I=i) \sim \mathcal{U}(a, b)$. Otherwise, learnt or inferred priors on the task durations can be applied.

Adopting a linear motion model, the state of the user's finger $s_k = [c_k' \, \dot{c}_k']'$ at time $t_k$ is assumed to follow the linear Gaussian motion model:

$$s_k = F_k s_{k-1} + \varepsilon_k \quad \text{(BD 3)}$$

with $\varepsilon_k \sim \mathcal{N}(0, Q_k)$. This general form permits many useful motion models, the simplest of which is the (near) constant velocity model, which is the solution of the continuous-time stochastic differential equation $$ds_t = \begin{bmatrix} 0_3 & I_3 \\ 0_3 & 0_3 \end{bmatrix} s_t \, dt + \begin{bmatrix} 0_3^v \\ \sigma \end{bmatrix} dW_t$$

where $dW_t$ is the instantaneous change of a standard Brownian motion at time t, $0_3$ is a 3×3 zero matrix, $1_3$ is a 3×3 identity matrix and $0_3^v$ is a 3×1 zero vector. The corresponding $F_k$ and $Q_k$ matrices in equation (BD 3) are given by $F_k = M(\Delta_k)$ and $Q_k = R(\Delta_k)$ and $Q_k = R(\Delta_k)$, where the time step $\Delta_k = t_k - t_{k-1}$ (which can vary, allowing asynchronous observations), and $$M(p) = \begin{bmatrix} I_3 & pI_3 \\ 0_3 & I_3 \end{bmatrix}, \, R(p) = \begin{bmatrix} \frac{1}{3}p^3 I_3 & \frac{1}{2}p^2 I_3 \\ \frac{1}{2}p^2 I_3 & pI_3 \end{bmatrix} \quad \text{(BD 4)}$$

with $\sigma$ setting the motion model state transition noise level. The movements in the x, y and z dimensions are considered to be independent from one another. Observations are assumed to be a linear function of the current system state with additive Gaussian noise, such that $$m_k = H_k s_k + \eta_k \quad \text{(BD 5)}$$

with $\eta_k \sim \mathcal{N}(0, V_k)$. It is noted that other motion models suitable for intent inference that could be utilised in this framework. Those include the destination-reverting models and the linear portion of the perturbation removal model.

Without conditioning information, the distribution of a hidden state $s_k$ given observations $m_{1:k}$ in equations (BD 3) and (BD 5) can be calculated by a standard Kalman Filter (KF) as per $p(s_k|m_{1:k}) = \mathcal{N}(s_k; \mu_{k|k}^{KF}, \Sigma_{k|k}^{KF})$, with (using the 'correct' step of the Kalman filter):

$$\mu_{k|k}^{KF} = \mu_{k|k-1}^{KF} + K_k(m_k - H_k \mu_{k|k-1}^{KF}) \quad \text{(BD 6)}$$

$$\Sigma_{k|k}^{KF} = (I_6 - K_k H_k)\Sigma_{k|k-1}^{KF} \quad \text{(BD 7)}$$

$$K_k = \Sigma_{k|k-1}^{KF} H_k' (H_k \Sigma_{k|k-1}^{KF} H_k' + V_k)^{-1}.$$

Here, $\mu_{k|k-1}^{KF}$ and $\Sigma_{k|k-1}^{KF}$ are derived from the inferred system distribution at t−1, given by the prediction step of the KF:

$$\mu_{k|k-1}^{KF} = F_k \mu_{k-1|k-1}^{KF} \quad \text{(BD 8)}$$

$$\Sigma_{k|k-1}^{KF} = F_k \Sigma_{k-1|k-1}^{KF} F_k' + Q_k \quad \text{(BD 9)}$$

when k=1, these quantities are given by the priors, so that $\mu_{1|0}^{KF} = \mu_{prior}$ and $\Sigma_{1|0}^{KF} = \Sigma_{prior}$. They represent prior knowledge of track start position, $p(s_1) \sim \mathcal{N}(\mu_{prior}, \Sigma_{prior})$.

In order to condition on the system state at the destination arrival time, $s_T$, it is necessary to evaluate the density $p(s_T|s_k)$ for the current tracked object state (and arrival time). For motion models derived from continuous-time processes, such as the near constant velocity model, this is possible by direct integration of the motion model (which is possible in the linear time-invariant Gaussian case). For the near constant velocity model, this is given by $p(s_T|s_k) \sim \mathcal{N}(s_T; M_k s_k, R_k)$, where $M_k = M(T-t_k)$ and $R_k = R(T-t_k)$ from equation (BD 4), and $T-t_k$ is the time step between the $T^{th}$ and $t_k^{th}$ observations. Alternatively, forward or backward recursions can be formed in terms of $F_{2:T}$ and $Q_{2:T}$, which can be used with discrete models without a continuous-time interpretation.

Subsequently, the conditional predictive distribution of $s_k$ given the k−1 observations and the intended destination (which specifies $s_T$) can be shown to reduce to $$p(s_k|m_{1:k-1},s_T) = \mathcal{N}(s_k; \mu_k^*, \Sigma_k^*) \quad (BD\ 10)$$

$$\mu_k^* = \mu_{k|k-1}^{KF} + K_k^*(s_T - M_k \mu_{k|k-1}) \quad (BD\ 11)$$

$$\Sigma_k^* = (I_6 - K_k^* M_k)\Sigma_{k|k-1}^{KF} \quad (BD\ 12)$$

$$K_k^* = \Sigma_{k|k-1} M_k'(M_k \Sigma_{k|k-1} M_k' + R_k)^{-1}.$$

This can be seen by analogy to the 'correct' step of the standard Kalman filter.

By taking the latest observation into account, the correction stage (taking account of $m_k$) can be shown to be:

$$p(s_k|m_{1:k},s_T) \sim \mathcal{N}(s_k; \mu_k, \Sigma_k) \quad (BD\ 13)$$

where $\mu_k = \mu_k^* + \tilde{K}_k(m_k - H_k \mu_k^*)$, $\Sigma_k = (I_6 - \tilde{K}_k H_k)\Sigma_k^*$ and $\tilde{K}_k = \Sigma_k^* H_k'(H_k \Sigma_k^* H_k' + V_k)^{-1}$.

This can also be seen by analogy with the 'correct' step of the Kalman filter noting that $$p(s_k|m_{1:k},s_T) \propto \mathcal{N}(m_k; H_k s_k, V_k)\mathcal{N}(s_k; \mu_k^*, \Sigma_k^*).$$

Together with the standard KF, the above predict and correct steps allow the conditional distribution of finger position to be calculated at the time of each observation, conditional on the destination and arrival time. It remains to calculate $$p(m_{1:k}|B_i,T) = \Pi_{l=1}^{k} p(m_l|m_{1:l-1},s_T) \quad (BD\ 14)$$

where it can be shown that:

$$p(m_k|m_{1:k-1},s_T) = \int p(m_k|s_k)p(s_k|m_{1:k-1},s_T)ds_k = \mathcal{N}(m_k; H_k \mu_k^*, H_k \Sigma_k^* H_k'). \quad (BD\ 15)$$

This is equivalent to the prediction error decomposition in the KF. Note that the likelihood calculation is the objective of filtering, the corrective step in equation (BD 13) is not required.

Using the likelihood in equation (BD 14), the probability of each nominal destination can be evaluated via equations (BD 1) and (BD 2) upon arrival of a new observation. The integral in equation (BD 1) can be calculated using a two-step Kalman filter if a linear model is used to describe the tracked object motion or dynamics as per equation (BD 1) to (BD 15). This includes utilising the destination-reverting models, such as the MRD and ERV, within the bridging-distributions-based predictor framework. For non-linear motion models, such as nonlinear destination reverting models, modified advanced statistical inference methods, such as sequential Monte Carlo or Markov chain Monte Carlo techniques, can be employed. Therefore, various models that describe the tracked object dynamics can be used within the bridging-distributions-based prediction framework, thus it can be considered to be a more general approach compared to the original destination-reverting methods.

Whilst the BD approach requires some prior knowledge about the total duration of the pointing task, i.e. distribution of those durations rather than a fixed value, it delivers superior prediction results compared to using the destination-reverting models alone as shown below. The required prior knowledge, this is $P(T|B_i)$, can be obtained during the training phase undertaken by the system user or from previously observed trajectories.

Predictors using bridging distributions also allow the intended destination to be defined as a spatial region. This approach takes into account the destinations sizes and caters for the scenario when the destinations can have distinct sizes/spatial-areas. This is achieved by defining each destination as a random variable with a mean and covariance. The location of the centre of the destination can be the distribution mean (or a function of the mean) and the variance captures the destination spatial area (or the spatial area is a function of the covariance). This is a more practical formulation compared to the original destination-reverting-based techniques, such as MRD and ERV, where each destination is considered to be a single location/point.

As will be described below with reference to FIG. 12, the bridging model is able to predict, well in advance, the intended destination of an object, such as of an in-vehicle pointing gesture. In this case, the pointing gesture time or duration may be reduced.

If the observations model for the LDR or NLDR or BD is not linear or present noise is non-Gaussian, for example $m_k = f_k(s_k) + n_k$ where $f_k(.)$ is a nonlinear function, alternative statistical filtering approaches such as sequential Monte Carlo methods or other numerical techniques may be utilised to attain the pursued $P(m_{1:k}|B_i)$.

While the processing means 220 produces the probability of each target being the destination, it might be desirable to sequentially obtain in real-time the underlying unperturbed pointing object trajectory or its characteristics represented by $s_k$, thus after removing unintentional movements or the present perturbations. This can either be achieved by combining the results of the N statistical filters used for intentionality prediction or to perform the smoothing operation as a pre-processing stage that precedes calculating $\{P(m_{1:k}|B_i), i=1, 2, \ldots, N\}$. In the former, it is equivalent to calculating the posterior distribution of the state $s_k$ at the time instant $t_k$; $s_k$ incorporates the pointing object location $c_k$. The distribution is given by $P(s_k|m_{1:k}) = \Sigma_{i=1}^{N} P(s_k|B_i, m_{1:k})P(B_i|m_{1:k})$ where $$P(B_i|m_{1:k}) = \frac{P(m_{1:k}|B_i)P(B_i)}{\sum_{n=1}^{N} P(m_{1:k}|B_n)P(B_n)}$$

such that $P(s_k|m_{1:k}, B_i)$ is produced by the sequential state update of the statistical filter and $P(B_i|m_{1:k})$ for $i=1, 2, \ldots, N$ is a determined constant. The summation in $P(s_k|m_{1:k})$ results in a mixed Gaussian model with the minimum mean squared error or a maximum a posteriori estimators of $s_k$ being the mean and mode of the resultant distribution, respectively.

Removing the perturbations prior to calculating $\{P(m_{1:k}|B_i), i=1, 2, \ldots, N\}$ to establish the intended destination or destinations entails modelling the pointing process as the sum of the intentional pointing object movements plus unintentional perturbations or noise. In this case, the observed pointing object location using a pointing object tracker module 210 can be modelled as $$m_k = s_k + p_k + \varepsilon_k$$

where the unintentional perturbations-related movements and their characteristics are captured in $p_k$ and the measurement noise is denoted by $\varepsilon_k$. Various perturbation models can be used including the jump diffusion model. The true pointing movement and/or its characteristics can be modelled using a linear model, thus $s_k = F_k s_k + v_k$ where $s_k$ incorporates the location of the pointing object, velocity, acceleration, etc. Whereas, $F_k$ is the state transition matrix and $v_k$ is the present noise. Nearly constant velocity or acceleration models can be used to model the pointing movement in this case, which is independent of the destination. Statistical filtering approaches can be applied to extract $s_k$ from $m_k$ by removing or suppressing the unintentional perturbations-related movements. Such techniques include Kalman filtering in case of linear state and perturbations models. Various adapted version of Kalman filtering, sequential Monte Carlo methods or other numerical techniques can be utilised for nonlinear state or observation models.

Figure 9:
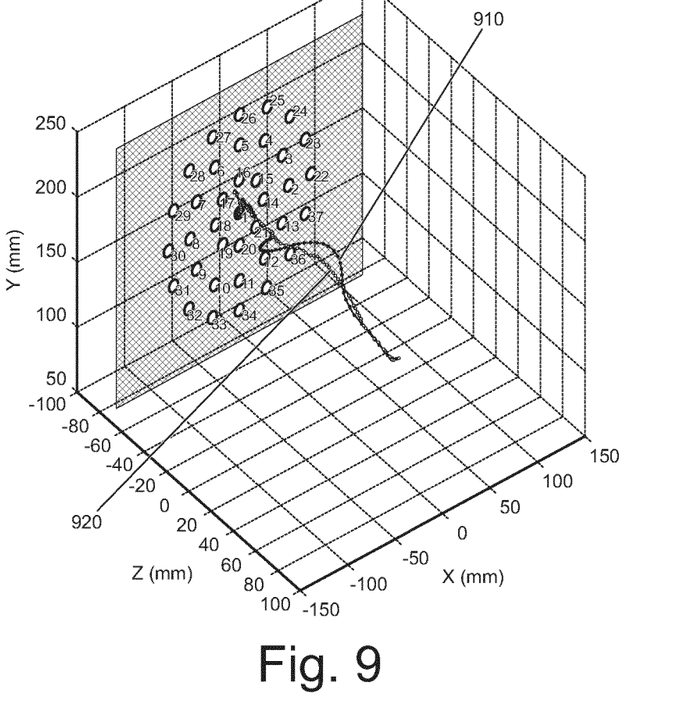
FIG. 9 is an illustration of a perturbed trajectory and a filtered trajectory of an object according to an embodiment of the invention.

FIG. 9 illustrates a trajectory 910 of an object which exhibits perturbations due, for example, to movement of a vehicle in which the object is moving. A filtered trajectory 920 of the object is also shown which exhibits a more direct course toward the intended target.

It has been observed by the present inventors that only a weak correlation exists between acceleration determined from data output by the location sensing device 210 and that measured by an Inertia measurement unit (IMU) or accelerometer. Thus, whilst use of the IMU data to compensate for noise in the location measurements may not be effective, the IMU data may be used for modifying applied preprocessing and/or the model.

The processing means 220 may comprise an intent inference module 222 for determining the intended target $\hat{B}(t_k)$ of the object at time instant $t_k$.

Determining the intended destination, or a number of possible destinations, or the area of the possible destinations at the time instant $t_k$ relies on the calculated probabilities $P(B_i|m_{1:k})$ for $i=1, 2, \ldots, N$. The decision may be based on a cost function $\mathcal{C}$ $C(B_i, B^*)$ that ranges from 0 to 1. It penalises an incorrect decision where $B_i$ is the predicted destination and $B^*$ is the true intended target in the considered pointing task. For example predicting the wrong destination may impose a maximum cost of 1. Therefore, the objective is to minimise the average of the cost function in a given pointing task given the partially observed pointing trajectory $m_{1:k}$ according to $$\hat{B}(t_k) = \arg\min_{B_i \in \mathcal{B}} \mathbb{E}[\mathcal{C}_{(B_i, B^*)|m_{1:k}}]$$

where $\mathbb{E}[.]$ is the mean. Assume the hard-decision criterion where $\mathcal{C}(B_i, B^*) = 0$ if $B_i = B^*$ and $\mathcal{C}(B_i, B^*) = 1$ otherwise leads to selecting one target out of the set $\{B_i: i=1, 2, \ldots N\}$. In this case, it is equivalent to determining the MAP destination estimate. Other cost function formulations that reflect the desired level of predication certainty may be used and subsequently a group of selectable targets may be selected in lieu of one as with the MAP case.

The Bayesian approach relies on a belief-based inference followed by a classifier. Since the aim is to utilise the available pointing trajectory to determine the destination, a uniform prior may in some embodiments be assumed on all items, for example $P(B_i)=1/N$ for $i=1, 2, \ldots, N$. In this case, the classification problem corresponds to the maximum likelihood estimation and the solution relies solely on establishing $P(m_{1:k}|B_i)$ for $i=1, 2, \ldots, N$. However, in other embodiments a non-uniform prior may be used for the items. For example information concerning previous selections from a GUI may be used as the prior such that the likelihood of the intended destination is influenced by a history of user selections. It will be realised that the prior may alternatively or additionally be based on other information.

In some embodiments only a last L logged true object positions i.e. $c_{k-L:k} \triangleq \{c_{k-L}, c_{k-L+1}, \ldots, c_k\}$ and $k-L>0$ may be used to determine $\hat{B}(t_k)$. In these embodiments a sliding time window is applied to the trajectory data and a width of the window may be chosen appropriately.

Figure 4:
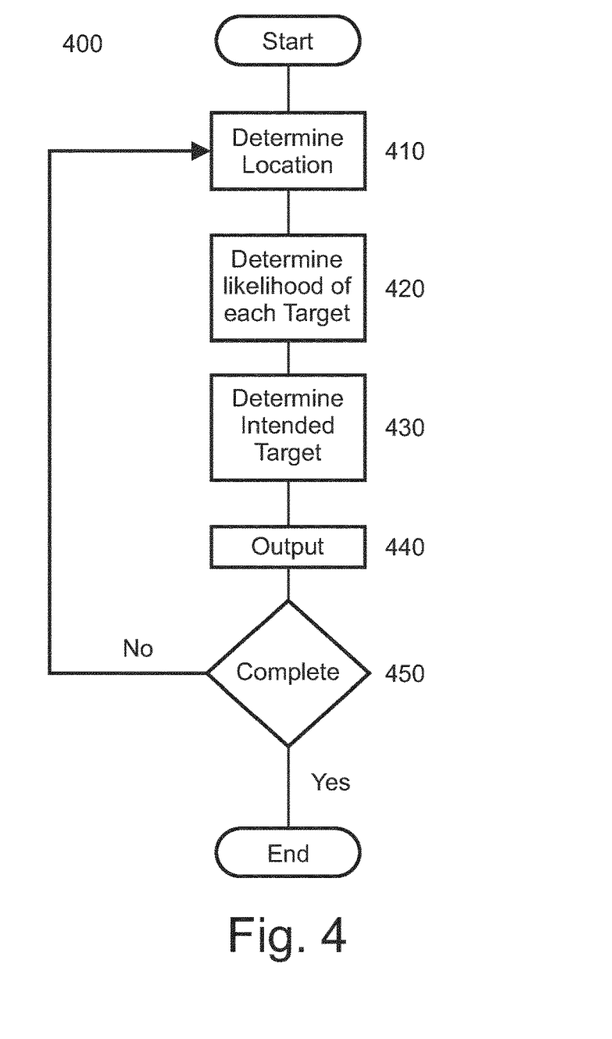
FIG. 4 shows an illustration of a method according to an embodiment of the invention.

FIG. 4 illustrates a method 400 according to an embodiment of the invention. The method 400 may be performed by the system 200 described with reference to FIG. 2.

In step 410 a location of the object at an instant in time is determined. The location of the object may be determined by the location sensing device 210 receiving radiation, such as light or sound, reflected from the object and, from the received radiation, determining at the time instant $t_k$ location data as $m_k \triangleq [\hat{x}_{t_k}, \hat{y}_{t_k}, \hat{z}_{t_k}]^T$ indicative of the location of the object. The location data may be stored in a memory to form data indicative of a trajectory of the object over a period of time.

In step 420 a likelihood of one or more items being the intended target of the object is determined. The likelihood P may be determined as $P(B_i|m_{1:k})$ as explained above. Step 420 may be performed by the trajectory module 221, as previously explained. In some embodiments the likelihood for each of a plurality of items as $P(B_i|m_{1:k})$ being the intended destination is determined in step 420. The likelihood for the one or the plurality of items being the intended destination is determined based upon a model and the location of the object determined in step 410.

In step 430 the intended target is determined. The intended target may be determined from the likelihood for each of a plurality of items as $P(B_i|m_{1:k})$. Step 430 may be performed by the intent inference module 222 as discussed above. Step 430 may comprise determining the Maximum a Posteriori (MAP).

In some embodiments the method 400 comprises a step 440 in which an output is determined based on the result of step 430. The output may comprise a selection or operation of the intended target. That is, where the intended target is a user-selectable item on the GUI, the item may be selected as though the user had touched the display device to select the item. Alternatively where the intended target is a button or control the button or control may be activated.

The output may be provided via the display device 230. The output may be a modification of the GUI displayed on the display device responsive to the determination of the intended target in step 430. The output may only occur once the likelihood associated with the intended target reaches a predetermined probability P, thereby avoiding the item being selected when the likelihood is relatively low. In some embodiments the output of step 440 may comprise a modification to the appearance of the GUI. For example the intended target may be highlighted on the GUI. The intended target may be highlighted when the likelihood associated with the intended target reaches a predetermined probability P. The predetermined probability may be lower than that for selection of the intended target, such that, at a first lower probability the intended target is visually indicated and at a second higher probability the intended target is automatically selected. In another embodiment a group of intended targets may be visually indicated in the GUI when their associated likelihood's of being the intended target are at least the predetermined probability P.

In step 450 it is determined whether the method is complete. If the method is not complete, then the method returns to step 410. If, however, the method is complete then the method ends. The method 400 may be complete when the likelihood associated with one or more items reaches a predetermined threshold probability. For example the method 400 may end when the likelihood reaches the second probability discussed in relation to step 440 at which the intended target is automatically selected.

Figure 5:
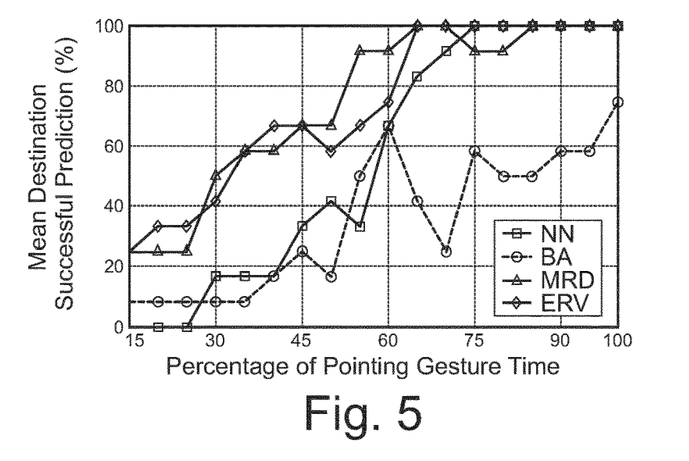
FIG. 5 shows an illustration of performance of various embodiments of the invention.
Figure 6:
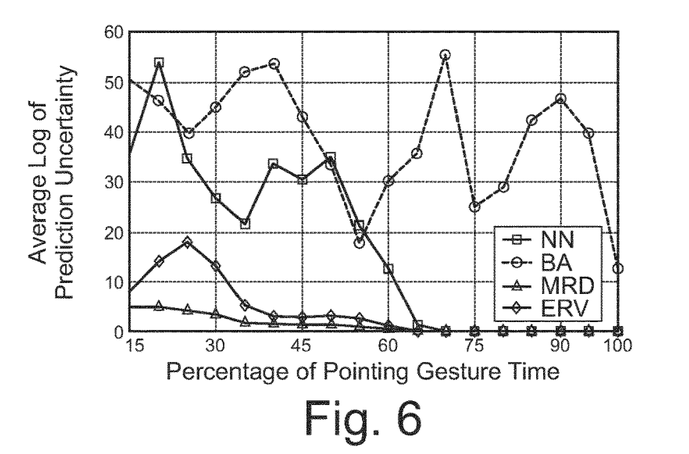
FIG. 6 shows a further illustration of performance of various embodiments of the invention.

FIG. 5 illustrates results of an experiment at predicting an intended item on a GUI against a percentage of completed pointing movement i.e. $100 \times t_k/t_M$ and averaged over all considered pointing tasks ($t_M$ is the total pointing task completion time). Results using the NN, BA, MRD and ERV models are illustrated. FIG. 5 starts after completing 15% of the pointing trajectory duration prior to which none of the techniques produce meaningful results. To represent the level of average prediction uncertainty, FIG. 6 displays the mean of the uncertainty metric given by $$\varepsilon(t_k) = -\log_{10}(P(B^*(t_k)|m_{1:k}))$$

where $P(B^*(t_k)|m_{1:k})$ is the calculated probability of the true intended item according to the prediction model at time instant $t_k$. If the true target is predicted with high certainty, i.e. $P(B^*(t_k)|m_{1:k}) \to 1$, the confidence in the prediction will be very high as $\varepsilon(t_k) \to 0$. It is noted that the level of the predictor's success in inferring the destination does not necessarily imply high prediction certainty and vice versa. In all the simulations, we do not assume that the predictor knows the proportion of the completed trajectory when making decisions. It can be noticed from FIG. 5 that the proposed Bayesian approach provides the earliest successful predictions of the intended target, especially in the crucial first 15% to 75% of the pointing movement duration. This success can be twice or three times that the nearest examined competitor. Both MRD and ERV models exhibit similar behaviour, with MRD prediction quality marginally and temporarily degrading in the 70%-80% region. This can be due to a failed prediction in a single experiment. Both of these models provide significant performance improvements compared with other techniques. The NN method tends to make successful predictions only in the final portion of the pointing task since the user's finger is inherently close to the intended item at this stage, i.e. briefly before the selection action. In practice, an early prediction, e.g. in the first 75% of the pointing task duration, is more effective at minimising the user movement/cognitive effort, enabling early pointing facilitation techniques and enhancing the overall user experience. The benefits of successful intent inference in the last 25% of the pointing gesture duration are questionable since the user has already dedicated the necessary effort to execute the selection task. The proposed predictors notably outperform the NN for the majority of the duration of the pointing task (or all in the ERV case). With regards to the prediction uncertainty, FIG. 6 shows that the introduced Bayesian predictions can make correct classification decisions with substantially higher confidence levels compared with other techniques. This advantage over the NN model inevitably diminishes as the pointing finger gets closer to the interface in the last portion of the pointing gesture period, e.g. after completing over 75% of the pointing movement.

Figure 7:
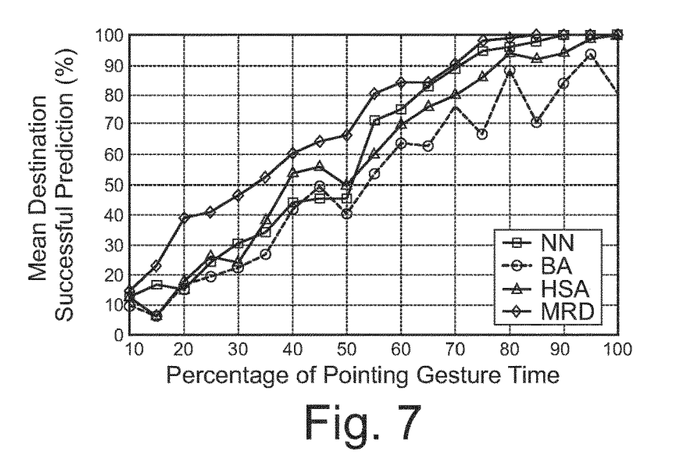
FIG. 7 shows a still further illustration of performance of various embodiments of the invention.

FIG. 7 provides a similar plot to FIG. 5 illustrating prediction based on the NN, BA, HSA and MRD models. Again it can be noticed from FIG. 7 that the MRD model provides the earliest successful predictions of the intended destination, especially in the crucial first 85% of the pointing gesture.

The performance of the proposed Bridging Distributions (BD) predictor for 57 pointing tracks collected in an instrumented car driven over various road types was assessed. The data pertains to four passengers undertaking pointing tasks to select highlighted GUI icons displayed on the in-vehicle touchscreen. The layout of the GUI is similar to that in FIGS. 1 and 2 with 21 selectable circular icons that are less than 2 cm apart.

Figure 10:
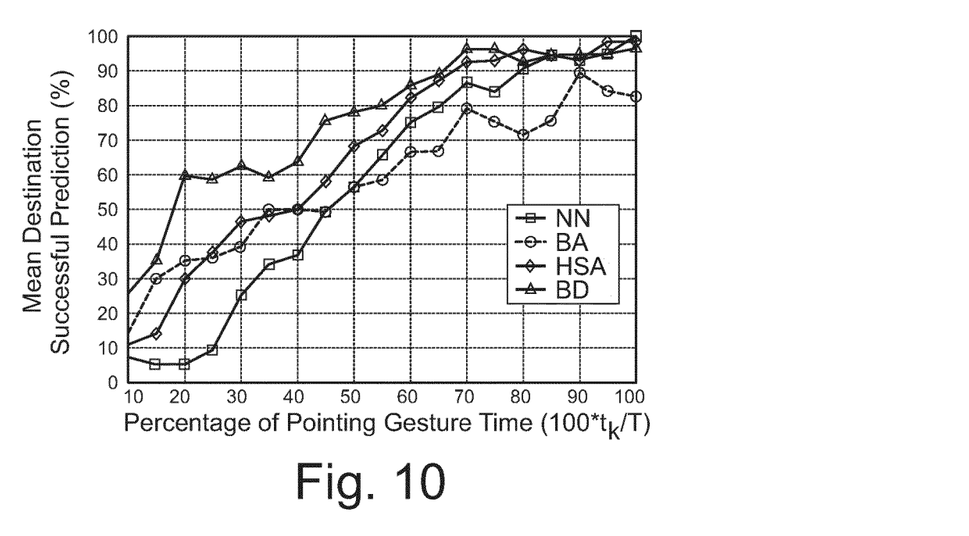
FIG. 10 is an illustration of mean percentage of destination successful prediction for various models according to embodiments of the invention.
Figure 11:
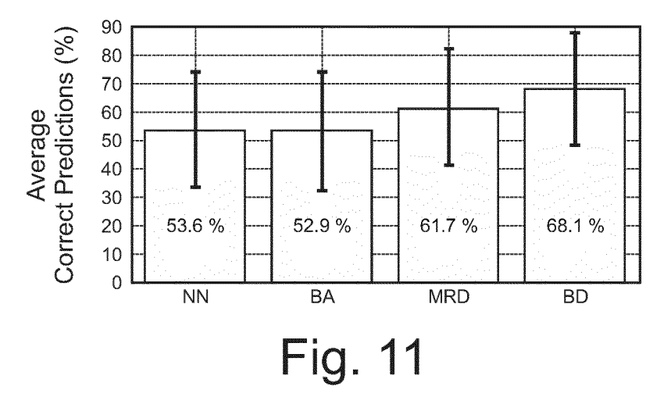
FIG. 11 is an illustration of gesture portion (in time) with successful prediction for various models according to embodiments of the invention.

The predictor performance is evaluated in terms of its ability to successfully establish the intended icon I via the MAP estimator in (BD 2), i.e. how early in the pointing gesture the predictor assigns the highest probability to the intended GUI icon I. This is depicted in FIG. 10 against the percentage of completed pointing gesture (in time) and averaged over all pointing tasks considered. FIG. 11 shows the proportion of the total pointing gesture (in time) for which the predictors correctly established the intended destination. To represent the level of average prediction uncertainty, FIG. 12 displays the mean of the uncertainty metric given by $\vartheta(t_k) = -\log_{10} p(B_i|m_{1:k})$ where i is the true intended destination; it is expected that $\vartheta(t_k) \to 0$ as $t_k \to T$ for a reliable predictor.

FIG. 10 shows that the introduced bridging-distributions based inference achieves the earliest successful intent predictions. This is particularly visible in the first 75% of the pointing gesture where notable reductions in the pointing time can be achieved and pointing facilitation regimes can be most effective. The performance gap between the various predictors diminishes towards the end of the pointing task. An exception is the BA model where the reliability of the heading angle as a measure of intent declines as the pointing finger gets closer to the target. FIG. 11 shows that the BD approach delivers the highest overall correct predictions across the pointing trajectories (NN and BA performances are similar over the relatively large data set considered).

Figure 12:
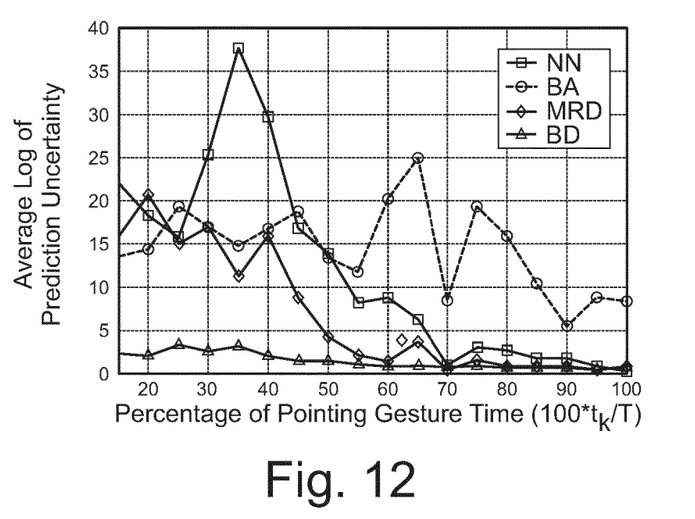
FIG. 12 is an illustration of average log prediction uncertainty according to embodiments of the invention.

FIG. 12 illustrates that the proposed BD model makes correct predictions with significantly higher confidence throughout the pointing task, compared to other methods. Overall, FIGS. 10, 11 and 12 demonstrate that the BD inference approach introduced predicts, well in advance, the intent of an in-vehicle pointing gesture, e.g. only 20% into the gesture in 60% of cases, which can reduce pointing time/effort by 80%.

It can be appreciated that embodiments of the present invention provide methods and apparatus for determining an intended target of an object, where the object may be a pointing object such as a stylus or finger, although the invention is not limited in this respect. The intended target may be one or more intended targets from a plurality of possible targets. The possible targets may be items in a GUI or physical controls. Advantageously embodiments of the present invention may reduce errors associated with HMI, such as by detecting when a selected target was not the intended target i.e. the user accidentally selected a GUI item due to, for example, vehicle movement. Advantageously embodiments of the invention may also reduce a gesture time by selecting a target before a user is able to physically touch the target.

Figure 8:
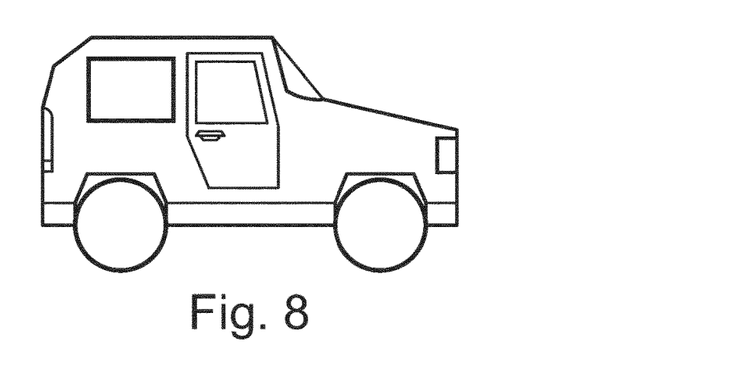
FIG. 8 shows a vehicle according to an embodiment of the invention.

Embodiments of the invention may be useful in vehicles such as land vehicles, as illustrated in FIG. 8 which comprises a system according to an embodiment of the invention or a processing device arranged to perform a method according to an embodiment of the invention, but also aircraft and watercraft. Embodiments of the invention may also be useful with computing devices such as portable computer devices e.g. handheld electronic devices such as smartphones or tablet computing devices.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A human-machine interaction method of determining an intended target of an object in relation to a user interface, the method comprising:
   determining a three-dimensional location of the object at a plurality of time intervals;
   receiving one or more items of environmental information, wherein the environmental information comprises one or more of: information indicative of acceleration of a vehicle, information indicative of a state of the vehicle and image data indicative of surroundings of the vehicle;
   determining a metric associated with each of a plurality of items of the user interface, the metric indicative of a respective item being the intended target of the object, wherein the metric is determined based upon a model and the three-dimensional location of the object at the plurality of time intervals, wherein the model models movement of the object with respect to the plurality of items and unintentional perturbations of the object movement and the determination of the metric is based on the one or more items of environmental information, and wherein the model is selected based on the one or more items of environmental information; and
   determining, using a Bayesian reasoning process, the intended target from the plurality of items of the user interface based on the metric associated with each of the plurality of items.

2. The method of claim 1, further comprising determining a trajectory of the object, wherein the trajectory of the object comprises data indicative of the three-dimensional location of the object at the plurality of time intervals.

3. The method of claim 2, further comprising filtering the trajectory of the object, wherein the filtering comprises one or more of: smoothing the trajectory of the object, reducing unintended movements of the object, and removing noise from the trajectory.

4. The method of claim 1, wherein the model comprises at least one of the following:
   a Bayesian intentionality prediction model;
   a nearest neighbor (NN) model;
   a bearing angle (BA) model;
   a heading solid angle (HSA) model;
   a Linear Destination Reversion (LDR);
   a Nonlinear Destination Reversion (NLDR) model;
   a Mean Reverting Diffusion (MRD) model; and
   an Equilibrium Reverting Velocity (ERV) model.

5. The method of claim 1, wherein the model is a linear model comprising one or more filters, and wherein the one or more filters comprise Kalman filters.

6. The method of claim 1, wherein the model is a non-linear model that incorporates irregular movements of the object and/or comprises one or more particle filters.

7. The method of claim 1, wherein the model is a bridging model, and further comprising determining a plurality of bridging models, each associated with a respective target, wherein each bridging model is based upon a duration of the plurality of time intervals and/or wherein each bridging model is based upon a spatial area of each of the plurality of targets.

8. The method of claim 1, wherein the determining the intended target is based on a cost function, and/or the intended target is determined so as to reduce the cost function.

9. The method of claim 1, further comprising one or both of outputting an indication of the intended target and outputting the indication of the intended target and one or more possible targets, wherein the indication of the intended target comprises identifying the intended target.

10. The method of claim 1, further comprising activating the intended target.

11. The method of claim 1, wherein the plurality of items comprise one or more of graphically displayed items or physical controls.

12. The method of claim 1, wherein the user interface is a user interface of the vehicle.

13. The vehicle comprising a processing device configured to perform the method of claim 1.

14. A human-machine interface (HMI) system for determining an intended target of an object in relation to a user interface, the system comprising:
   a location sensing device that determines a three-dimensional location of the object;

a memory that stores data indicative of the three-dimensional location of the object at a plurality of time intervals and data indicative of one or more items of environmental information, wherein the environmental information comprises one or more of: information indicative of acceleration of a vehicle, information indicative of a state of the vehicle and image data indicative of surroundings of the vehicle;

at least one processor arranged to:

determine a metric associated with each of a plurality of items of the user interface, a respective item being the intended target of the object, wherein the metric is determined based upon a model and the three-dimensional location of the object at the plurality of time intervals, wherein the model models movement of the object with respect to the plurality of items and unintentional perturbations of the object movement and the determination of the metric is based on the one or more items of environmental information, and wherein the model is selected based on the one or more items of environmental information; and     determine, using a Bayesian reasoning process, the intended target from the plurality of items of the user interface based on the metric associated with each of the plurality of items.

15. The system of claim 14, wherein the at least one processor is further arranged to determine a trajectory of the object, wherein the trajectory of the object comprises data indicative of the three-dimensional location of the object at the plurality of time intervals.

16. The system of claim 14, wherein the location sensing device is configured to receive radiation from the object, and/or comprises one or more imaging devices.

17. The system of claim 14, further comprising one or more accelerometers for outputting acceleration data, and/or a display configured to display a graphical user interface (GUI) thereon, wherein the plurality of items are GUI items.

18. The system of claim 14, wherein the at least one processor is arranged to receive environmental data from one or more sensing devices, wherein the one or more sensing devices are configured to determine the state of the vehicle and/or comprise imaging devices.

19. The vehicle comprising the system of claim 14.

\* \* \* \* \*